US009899035B2

(12) United States Patent
Kakadiaris et al.

(10) Patent No.: US 9,899,035 B2
(45) Date of Patent: Feb. 20, 2018

(54) SYSTEMS FOR AND METHODS OF INTELLIGENT ACOUSTIC MONITORING

(71) Applicants: Ioannis Kakadiaris, Bellaire, TX (US); Richard Willson, Houston, TX (US)

(72) Inventors: Ioannis Kakadiaris, Bellaire, TX (US); Richard Willson, Houston, TX (US)

( * ) Notice: Subject to any disclaimer, the term of this patent is extended or adjusted under 35 U.S.C. 154(b) by 0 days.

(21) Appl. No.: 15/344,114

(22) Filed: Nov. 4, 2016

(65) Prior Publication Data
US 2017/0125034 A1 May 4, 2017

Related U.S. Application Data

(60) Provisional application No. 62/250,897, filed on Nov. 4, 2015.

(51) Int. Cl.
H04R 29/00 (2006.01)
G10L 25/51 (2013.01)
G06F 3/16 (2006.01)

(52) U.S. Cl.
CPC .............. *G10L 25/51* (2013.01); *G06F 3/165* (2013.01)

(58) Field of Classification Search
CPC ...................................................... H04R 29/00
See application file for complete search history.

(56) References Cited

U.S. PATENT DOCUMENTS

| 2010/0142715 | A1* | 6/2010 | Goldstein | G06F 17/30743 381/56 |
| 2015/0347079 | A1* | 12/2015 | Price | H04R 3/005 700/94 |
| 2016/0173049 | A1* | 6/2016 | Mehta | H03G 3/32 381/57 |
| 2016/0178392 | A1* | 6/2016 | Goldfain | A61B 5/1123 702/104 |
| 2016/0367190 | A1* | 12/2016 | Vaitaitis | A61B 7/04 |
| 2017/0124847 | A1* | 5/2017 | Schulz | H04R 29/00 |

* cited by examiner

*Primary Examiner* — Olisa Anwah
(74) *Attorney, Agent, or Firm* — Conley Rose, P.C.

(57) ABSTRACT

A system for intelligent acoustic monitoring. The system includes a microphone to capture environmental acoustic data and a processor coupled to the microphone. The processor is configured to receive and perform acoustic analysis on the captured acoustic data to generate an acoustic signature, based on a result of the acoustic analysis, identify an event indicated by the acoustic signature, and perform a remedial action based on the identified event.

18 Claims, 2 Drawing Sheets

SYSTEMS FOR AND METHODS OF INTELLIGENT ACOUSTIC MONITORING

CROSS REFERENCE TO RELATED APPLICATION

This application is a non-provisional application claiming priority to U.S. provisional application Ser. No. 62/250,897, filed on Nov. 4, 2015, entitled "Systems for and Methods of Intelligent Acoustic Monitoring," the entire disclosure of which is incorporated by reference herein.

BACKGROUND

Conventional acoustic monitoring may be utilized in many different cases to observe or record an environment or behavior that is not possible to monitor in a first-person manner. As one example, acoustic monitoring may be employed to assist in caring for the elderly, animals, and particularly infants and small children. These conventional monitoring solutions may record and transmit sound and/or video, for example over a wireless or wired network or other communication link, to a receiving device that includes a speaker and/or display that a user may observe. Unfortunately, diagnosing an observed event or problem may only be possible through reliance on a user's intuition, which may be less accurate or clouded by subjective emotional influences, for example.

SUMMARY

Systems and methods for intelligent acoustic monitoring are disclosed herein. In one embodiment a system includes a microphone to capture environmental acoustic data and a processor coupled to the microphone. The processor is configured to receive and perform acoustic analysis on the captured acoustic data to generate an acoustic signature, based on a result of the acoustic analysis, identify an event indicated by the acoustic signature, and perform a remedial action based on the identified event.

In another embodiment, a method of intelligent acoustic monitoring includes capturing environmental acoustic data; performing acoustic analysis on the captured acoustic data to generate an acoustic signature; based on a result of the acoustic analysis, identifying an event indicated by the acoustic signature; and performing a remedial action based on the identified event.

In a further embodiment, a non-transitory computer-readable medium is encoded with instructions that, when executed by a processor, cause the processor to: receive captured environmental acoustic data; perform acoustic analysis on the captured acoustic data to generate an acoustic signature; based on a result of the acoustic analysis, identify an event indicated by the acoustic signature; and perform a remedial action based on the identified event.

In a yet further embodiment, a calming system includes a microphone to capture environmental acoustic data, and a processor coupled to the microphone. The processor is configured to receive and perform acoustic analysis on the captured acoustic data to generate an acoustic signature, and based on a result of the acoustic analysis, determine that the captured acoustic data is indicative of sound produced by a subject under stress. The processor is also configured to, responsive to a determination that that the captured acoustic data is indicative of sound produced by a subject under stress, generate a first audio signal selected to soothe the subject under stress, and to receive additional acoustic data from the microphone during and/or after generation of the first audio signal, and performing acoustic analysis of the additional acoustic data to determine whether the first audio signal is effective to soothe the subject under stress. The processor is further configured to responsive to a determination that the first audio signal is ineffective to soothe the subject under stress, generate a second audio signal selected to soothe the subject under stress, wherein the second audio signal is different from the first audio signal.

BRIEF DESCRIPTION OF THE DRAWINGS

The application describes various embodiments of the disclosed technologies with reference to the accompanying drawings, in which.

DETAILED DESCRIPTION

Figure 1:
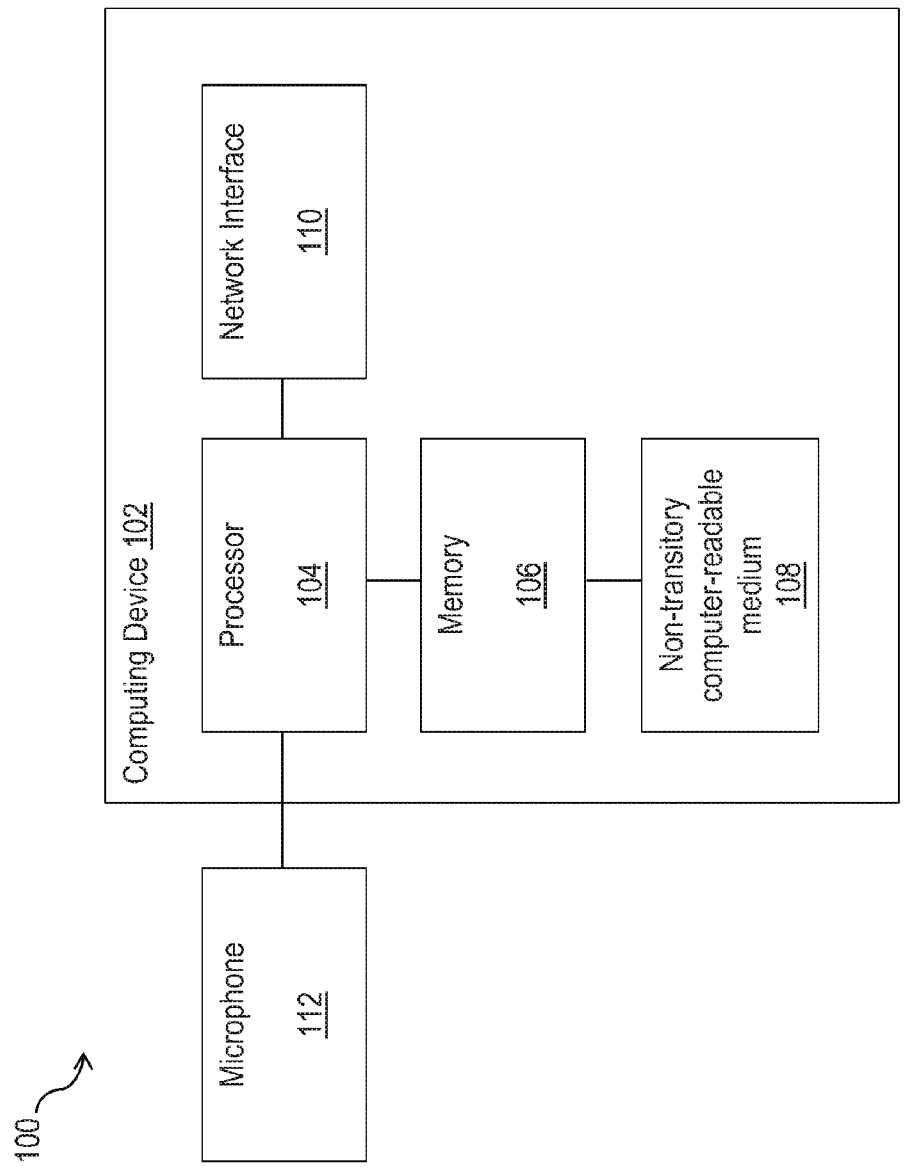
FIG. 1 illustrates a block diagram of a system for intelligent acoustic monitoring according to various embodiments of the present disclosure.

As explained above, much of conventional acoustic monitoring relies upon a user's intuition to diagnose an observed event, such as a child crying observed over a baby monitor. In accordance with embodiments of the present disclosure, a computing device such as a smartphone, laptop, or other electronic devices that include a processor is utilized in conjunction with one or more internal or external microphones or acoustic transducers to monitor events in an environment. The microphones may be controlled and/or monitored by a software application executed by the processor, for example on a user's smartphone. Based on an acoustic analysis of detected sounds, the software application or processor may react to or report events in a variety of ways, such as to central coordinating sites or over various wired or wireless networks (e.g., cellular or Wi-Fi networks) to improve acoustic event identification, data logging, and/or alerting.

Various embodiments of the present disclosure leverage a variety of techniques to identify events by sound. In some cases, the standard microphones of a mobile phone or computing device may be used; in other cases an accessory microphone connected to an existing mobile phone or computing device may be added; and in still other embodiments, a stand-alone (i.e., dedicated) acoustic monitoring device may be used, which may include outputs for external communication, for example over a wired or wireless network such as Wi-Fi or a cellular network.

Embodiments of the present disclosure may be utilized to detect a wide variety of events based on their acoustic signatures. A broad range of acoustic signatures may also be interpreted beyond simple event identification, such as, for example, extraction of evidence of vocal stress, sleep quality, or the severity of a cough. In many cases it may be desired to process the captured acoustic signal input locally, either on a smartphone application or by software running on a computing device, both for efficacy and for privacy. In some embodiments it may be beneficial to avoid transmitting sound data to a location far from the user.

Various embodiments of the present disclosure are directed to a system for intelligent acoustic monitoring. The system includes a microphone, which captures environmental sounds as acoustic data. The system, which, as explained above, may include a smartphone or other computing device, also includes a processor coupled to the microphone. In some cases, the microphone may be integrated into the computing device itself, while in other cases the microphone may be coupled to the processor over a wired or wireless network, or other similar connection. In either event, the processor receives the captured acoustic data from the microphone. Receiving the acoustic data from the microphone may include transfer of digital samples of the acoustic data from an analog-to-digital converter to the processor, reading digital samples from intermediate storage, etc. The processor performs an acoustic analysis on the data to generate an acoustic signature. For example, filtering or other types of frequency and/or amplitude analysis may be performed to identify distinctive features of the captured acoustic data, or to remove extraneous (e.g., background) noise components from the data. Based on a result of the acoustic analysis, the processor identifies a particular event indicated by the acoustic signature, for example by comparing attributes of the signature to a lookup table, database, or other data organization structure. In response to identifying a particular event indicated by the signature, the processor may then perform a type of remedial action. As will be explained in further detail below, the scope of event types and remedial action types is quite broad, and the scope of the present disclosure should not be construed to be limited to any particular event-remedial action combination.

Turning now to FIG. 1, a system 100 is shown that includes a computing device 102, such as a smartphone, personal computer, or dedicated device for intelligent acoustic monitoring. The computing device 102 includes a processor 104 coupled to a hardware memory 106. The processor 104 may be a general-purpose microprocessor, a digital signal processor, a microcontroller, or other device capable of executing instructions retrieved from a computer-readable storage device. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. The memory 106 may include volatile storage such as random access memory. In certain embodiments, instructions from a non-transitory computer-readable medium 108 may be stored in the memory 106 for subsequent execution by the processor 104. The non-transitory computer readable medium 108 may include volatile storage such as random access memory, non-volatile storage (e.g., a hard drive, an optical storage device (e.g., CD or DVD), FLASH storage, read-only-memory), or combinations thereof. The processor 104 is also coupled to a network interface 110, such as a wireless adaptor, a network interface card, or the like. The processor is also coupled to a microphone 112, which may be integrated into the computing device 102 itself, or coupled to the computing device 102 by way of a wired or wireless link, either directly to the processor 104 or to another hardware element of the computing device such as the network interface 110. In certain embodiments, the microphone 112 may be a specialized transducer to monitor vital signs of a living being, such as a heart rate monitor or the like. Some embodiments of the computing device 102 may also include a speaker, amplifier, and other sound generation circuitry and components.

The memory 106 may store a lookup table, database, or other data organization structure that associates particular acoustic signatures (or elements of acoustic signatures, such as filtered frequency components, amplitude components, and the like) with corresponding events. The data organization structure may be preprogrammed into the memory 106 based on prior-conducted acoustic research (e.g., data mining of audio/media files corresponding to known events). The data organization structure may also be generated by the processor 104 in conjunction with input provided by a user, such that the computing device 102 "learns" to associate particular acoustic signatures with particular events. For example, a user's baby's cries may correspond to a first acoustic signature that indicates the baby is hungry, or a second acoustic signature that indicates the baby needs to be changed. The processor 104 may receive acoustic data that corresponds to certain acoustic signatures, prompt the user for input to identify the event that is occurring, and then based on the user input, populate the data organization structure in memory 106 to associate these events with the corresponding signatures. Other embodiments may use a combination of a preprogrammed data organization structure along with subsequent user-based or computer learning adaptations to the data organization structure.

One particular application of the intelligent acoustic monitoring system 100 is in assisting the care of the elderly, animals, as well as infants and children. For example, the sleep/wake/activity profile of a child during the night can be recorded and analyzed and presented later based on sounds detected in the room where the child is sleeping. Informative features which can be extracted from the raw sound profile include crying, movements, burping, flatulence, the voice of a caretaker, disturbing noises such as traffic, car alarms, animal sounds, or others, and evidence of illness such as coughing or sneezing. Vocalizations such as babbling, humming, stimming behavior, crying, and singing also can be logged in memory 106. Heartbeat and breathing also may be monitored, especially using specialized microphones 112.

From the temporal relationships among events, for example, the processor 104 may extract informative patterns, such as a tendency of the child to be disturbed by outside noises or animal noises. Useful information may be gained about gas pains from a correlation of gastrointestinal gas-related events such as burping and flatulence with signs of activity or distress. Any of these events may be identified by the processor 104 based on analysis of acoustical information captured by the microphone 112, and subsequent remedial action may be taken. Although not limiting, remedial action may include the generation of a communication message to a parent's device (e.g., smartphone) or as noted above the logging and subsequent presentation of a summary of the child's activity, ailments, and possible correlation between these and other observed acoustic signatures.

Utilizing the intelligent acoustic monitoring system 100 to monitor children who are ill or potentially ill may be of particular benefit. For example, while logging events of coughing, sneezing, and the like would be valuable to caretakers, the processor 104 may also extract from acoustic signatures, generated from captured acoustic data, information regarding tendencies and trends, particularly amelioration or exacerbation of the ailment over time. Embodiments of the present disclosure may also characterize child sounds against standards, databases (local in memory 106 or remote through the network interface 110), or network comparators. As above, a remedial action taken may be informing the parent or caregiver of a particular ailment or likelihood of a particular ailment detected based on the observed acoustic signature.

For example, colic may be identified in such a way as to reassure parents. The intensity and duration of coughing may be compared against local, social-network, class, neighborhood, or global averages as an indicator of potential severity as an aid to deciding whether medical attention is required. The characteristic sounds of Whooping Cough (pertussis) may be used in diagnosing that disease in a presumptive fashion based solely on the monitoring of sounds. Sleep patterns, total amounts of sleep, duration of uninterrupted sleep, duration of sleep after feeding, all may usefully be estimated, and compared to outside norms or references. In these cases, the remedial action may include notifying a parent through a text message, electronic mail message, a voicemail message or the like; additionally or alternately, a physician or other health care worker may be alerted in more serious or emergent situations.

The intelligent acoustic monitoring system 100 may also be used to intervene; that is, to provide a remedial action that interacts with the child or individual being monitored. For example, the computing device 102 (or a speaker coupled to the computing device 102) may play any of several sounds or musical selections thought to be potentially ameliorative or soothing in response to an event such as a child being upset or unsettled. The computing device 102 may also monitor the response (i.e., through further acoustic monitoring) to the sounds generated and based on the improvement or devolvement of the sounds of crying and distress, begin to select more effective soothing sounds with the passage of time, and the accumulation of data for the specific child. Sound selections may include white noise, the sounds of water or wind, birdsong, music from any of many genres and cultural origins, as well as recordings of people's voices, whether talking or singing to the child.

In particular embodiments, the computing device 102 plays a first audio file of a playlist for a certain time period. Then, as acoustic monitoring continues, the processor 104 may determine whether the event (e.g., ailment or distress) persists. If the first audio file is not particularly successful, for example, the processor 104 may advance to the next audio file in the playlist. The ordering of audio files in the playlist may be initialized based on any number of factors, and may in fact be user-defined and based on cultural, geographic, socioeconomic, or geopolitical preferences, such as nursery rhymes known to have a particular significance or affinity to the user's culture. The processor 104 may also update the ordering of the playlist over time based on the child or other monitored individual's response to the particular tracks (e.g., a disliked or ineffective song may be moved farther down the playlist while a particularly helpful or calming song may be moved farther up the playlist).

The intelligent acoustic monitoring system 100 may also extract information about parent-infant interactions. For example, the role of the caretaker during the night may be identified by the sounds of footsteps, by the sound of the opening of the door, the squeaking of crib or bedsprings as the child is lifted, or by the presence of the adult's voice. These interactions may be logged in memory 106 and subsequently reported, which may be of interest to caretakers. As another example, parent-child interactions may be monitored by recording conversations and visits and other interactions between parents and child, especially at night, assessing the total quantity of time spent together and words exchanged between parent and child, and recording calming of an upset or crying child by the intervention of the parent. In this way, a knowledge base of behavior or reactions that tend to be more effective may be developed by the processor 104 and, for example, stored in memory 106 or otherwise reported to the parent or caregiver. Further, the psychological and emotional states of children may be assessed from acoustic monitoring, including total words spoken, other vocalizations, especially repetitive vocalizations, crying, whining, pretend crying (e.g., where the parent is prompted by the processor 104 or manually informs the processor 104 through user input that that particular acoustic signature is associated with a pretend crying event), and physical activity as judged by sounds of movement, footsteps, and the like. Acoustic signatures corresponding to eating may be noted, and the time since a previous meal may be used to interpret later sounds and alert caretakers, for example through the remedial action of generating a communication message or other message to a caretaker.

Although much of the foregoing is in relation to an infant or child, embodiments of the present disclosure may also be leveraged and applied to the monitoring of persons having diminished mental capacitor or the elderly. For example, with respect to the elderly, the processor 104 may detect, through acoustic analysis of data received from the microphone 112 that generates an acoustic signature, the sounds of falls, the presence of the voices not previously observed by the software (potentially caregivers, friends, or intruders), overall monitoring of sleep and wakefulness, and the monitoring of bathroom usage including the shower and commode, and taking medication. Certain embodiments of the present disclosure may utilize accessory medication or other packages that contain unique sound-producing characteristics (or that are modified to produce a characteristic click, chirp, or other sound) for straight-forward identification by the processor 104 of medication consumption, refrigerator opening, food consumption, and the like.

In a similar way, the intelligent acoustic monitoring system 100 may also assess food preparation and eating habits. For example, the processor 104 may detect events such as the opening of a refrigerator, eating with utensils, cooking, snacking outside of typical mealtimes, eating in the absence or presence of others, and meal duration. Each of these can be logged, reported, or in some cases cautioned or alerted. For example, in such a case, the remedial action taken may include providing a suggestion or recommendation of an altered pattern of behavior, such as providing a reminder to an individual prone to over-snacking that too many trips to the refrigerator have been made, providing a reminder of daily caloric intake goals, providing a reminder regarding eat-sleep patterns (e.g., the user sleeps better when they do not eat within two hours of their bed time), and the like. In certain embodiments, multiple microphones 112 may be located around a user's house such that various behaviors such as sleeping, eating, exercise, and other household activities may be correlated and cross-referenced by the processor 104 to provide a deeper understanding of the user's behavior and better-tailored remedial action advice to the user.

In addition to the foregoing, the processor 104 may not only detect duration and calmness of sleep, but also detect snoring and/or sleep apnea, and interactions between sleeping partners, such as when one partner gets up to go to the bathroom and awakens the other, may be logged in memory 106 and analyzed by the processor 104. A result of the processor 104 analysis may be the generation of a report recommending steps to take to improve overall sleep quality, or whether a healthcare professional should be involved for further monitoring, diagnosis, and/or treatment.

The intelligent acoustic monitoring system 100 may also be used to monitor animals including companion animals as well as pests and wild animals. For example, the above monitoring and remedial action of generating soothing sounds may be used to lessen the impact of separation anxiety for a companion pet, which is a common affliction among such pets, including dogs and cats, and also can affect other animals such as horses, cows and pigs. In a different embodiment, the processor 104 may detect pests such as rodents in a building based on the observed acoustic signature and generate an alert to a user as remedial action taken. Hobbyist users may also benefit from alerts that indicate the presence of unusual or particularly interesting animals by the sounds that they produce, such as birdcalls, or howling.

In certain embodiments, the intelligent acoustic monitoring system 100 may be used to record and possibly referee interpersonal interactions. For example, the processor 104 may analyze an acoustic signature generated based on the captured acoustic data to interpret the emotional tone of interactions between persons, or the fraction of interpersonal conversation that is of a negative or neutral speech tone, as an indicator of interpersonal stress. The processor 104 may also detect and log interruptions, which may be optionally flagged or signaled through a remedial action such as a light, a screen display, or a sound. In this way, the system 100 may provide coaching behavior to improve the overall quality of interpersonal communications based on the processor 104 detecting various indications of stress. The processor 104 may determine and correlate an individual's vocal stress level with immediately preceding events, including interactions with specific other people, driving, exercise, sleep, use of a computer, watching television, or playing video games. Remedial action may include generating an indication of a high percentage of speech for a given period that is of stressful or conflictual character in an attempt to curb or resolve likely ongoing stress of the user.

Assessment of the emotional quality of speech by the processor 104 may be further enhanced by measurements of speech speed, frequency, and volume, as well as the length of vocalizations and the degree of interruption in a conversation. Measurements of the speed of talking, stair climbing, driving (e.g., by location tracking through integration with a GPS system), and walking of the user can be leveraged by the processor 104 to provide an overall indication of emotional and energetic status. Remedial action may include generating a cautionary alert to the user if their level of energy, stamina, endurance, or emotional stability may be higher or lower than usual.

Similarly, and as described above with respect to detecting an acoustic signature that may indicate a particular ailment or illness, the processor 104 may interpret the spectral characteristics of speech as evidence of nasal congestion (e.g., possibly in conjunction with information on pollen and other allergen levels obtained from other sources such as a weather alert). The processor 104 may generate alerts and advice as remedial action, and advertisements may optionally be delivered to the user, when the processor 104 determines that an event indicated by the acoustic signature corresponds to a likelihood that the user is suffering from allergies.

The intelligent acoustic monitoring system 100 may also assess the time spent in neutral or positive emotional interactions with others, potentially also combining that with time spent alone and time spent in exercise, in inactivity, or interaction with electronic devices to form an overall estimate of the user's likely emotional state. As above, indications of the emotional state may be reported to the user as a remedial action or logged in memory 106 for subsequent analysis, for example by a healthcare professional. The amount of time the user spends interacting with electronic devices such as the television and electronic games and typing on a keyboard or talking to an electronic speech recognition device may also be monitored and logged by the processor 104. The result of this monitoring may be establishing (and reporting or logging) particular goals and standards for total or percentage of time spent in various activities as a way of maximizing individual wellness or time management. For example, a user of the system 100 may set a goal of having their time spent talking or otherwise in motion to be at least 50% as much as their time spent typing on a keyboard, or to have their low-emotional-stress talking time to be at least one hour per day.

The intelligent acoustic monitoring system 100 may also be used in various security applications, both positive and negative. Negative events that can be monitored by the processor 104 and microphone 112 include breaking glass, footsteps at night, screams and shouts, gunshots, sounds of struggle, and doors opening at atypical times. The processor 104 may interpret alarms, entry alarms, and door opening "chirps," and in the context of other information such as time of day, to reach conclusions on the necessity of alerting either the user or outside entities such as authorities as a remedial action. Similarly, the processor 104 may monitor positive security-related events such as closing of garage doors or other doors, and the engaging of locks and security systems upon a user leaving their residence, for example. If any of these expected actions is missing when it would otherwise normally occur, the system 100 may take the remedial action of alerting the user to pay greater attention to security precautions, or provide other learning-type guidance.

Certain embodiments of the present disclosure may utilize the system 100 to detect the presence of an individual, particularly children, in bathtubs and swimming pools. Once the processor 104 has identified that event through analysis of an acoustic signature, the processor 104 may take the remedial action of generating an alert to the individual's parent or caretaker.

The intelligent acoustic monitoring system 100 may also be used to monitor a variety of mechanical and vehicular functions. For example, the processor 104 may determine that a particular acoustic signature is associated with malfunctioning of cars, such as the sound of a slipping belt, squealing of tires, or brake function. This acoustic detection may be augmented by an optional accelerometer coupled to the system 100, indications of driving quality as judged by acceleration and deceleration, the sound of brakes and tires squealing, and horns being blown in the environment around the vehicle. The system 100 may be used to provide similar acoustic analysis in other mechanical environments such as factories and plants, and areas in which heavy machinery is actively deployed, but may be subject to malfunction during its lifespan.

The intelligent acoustic monitoring system 100 may also be used to monitor infrastructure, devices, and media in the environment. For example, the processor 104 may generate an acoustic signature based on acoustic data from the microphone 112 that indicates water running slowly or a toilet tank refilling regularly, which may be logged in memory 106 and flagged or reported to the user, repair services, or landlords. As another example, the running of a refrigerator cooling motor may be monitored and an acoustic signature corresponding to early signs of failure detected. In a similar way, the processor 104 may monitor air conditioner operation and used as a sign of potential need for repair. The processor 104 may optionally combine the acoustic monitoring with information related to ambient temperatures, for example gathered through a temperature probe or thermocouple coupled or integrated to the system 100. These embodiments may be of particular use to landlords and hotel operators, as this may allow for early, or preventive maintenance to minimize wastage of water or energy, and to avert substantial failure of systems.

When optionally combined with various media recognition tools, especially for recognizing music and sound tracks, acoustic monitoring may produce a complete log of media consumption in an environment, for personal interest, mediating disputes over selection, or monitoring media consumption to support advertising and assessment. As a specific example, monitoring services such as Nielsen might reimburse users for maintaining such a monitoring service in their households so their media consumption may be accurately assessed.

The intelligent acoustic monitoring system 100 may also be deployed in a networked or distributed manner, where multiple systems 100 or at least multiple distributed microphones 112 used by a single computing device 102 provide networked information services.

For example, the processor 104 may calculate arrival-time triangulation of the location of various events such as gunshots or other sounds of high interest using a network of sound analysis applications in an area. Similarly, the presence, progress, and predicted future locations of hazardous or interesting events can be established by having a variety of monitoring devices (e.g., microphones 112 in some cases, or entire systems 100 in others) at known locations detecting these events at known times and optionally extrapolating the future locations. The inclusion of GPS technology to the systems 100 could be used to further enhance these acoustic-based location determinations.

Other events of interest may include parades, riots, traffic jams, drunk drivers, and weather conditions such as tornadoes, earthquakes, and tsunamis. In another embodiment, the system 100 or distributed microphone 112 network may be used to observe doorbells along a block being rung sequentially, which the processor 104 may interpret as evidence that someone is casing the neighborhood looking for houses to burgle. Remedial action in any of these cases may include generating a report to authorities, an alert to users, or other types of notifications or combinations thereof.

In addition to geographical networking, the intelligent acoustic monitoring systems 100 may be deployed in a social networking aspect, where sound monitoring by the processors 104 is used to establish conclusions such as infection risk in a particular geographic or social network location. For example, a network of systems 100 monitoring individuals connected by a social network or a common workplace, or having children at the same school or daycare, might alert users that, for example, many of their Facebook friends who live near them currently have a cough (or more serious infectious disease) and that they may be at risk of becoming infected. Referring back to the above examples regarding stress in personal and interpersonal relations and livelihoods, a system 100 user could be alerted when an overall stress level of their social network friends it high, or the level of flu infections in a neighborhood could be signaled to people living in that neighborhood.

Although the above-described examples are myriad, they are not exhaustive, and the disclosed system 100 for intelligent acoustic monitoring may be used to identify various events based on their acoustic signature and also to provide some remedial action upon the identification of a particular event. The remedial action may take a number of forms and be as simple as logging event occurrences in memory 106, generating a report of logged occurrences from memory 106, generating an alert to a user or the authorities, and the like. Further, in some instances, a networked or distributed architecture may be leveraged to provide a further wealth of information regarding a particular geographic location, network of people, or combinations thereof.

One embodiment of particular note is the disclosed baby monitor and/or calmer. As explained above, such a device may record sounds of the baby for association with an event through user input, and may also receive and record sounds from other devices such as other smartphones, computers, and the Internet to categorize those particular sounds and acoustic signatures as being associated with a particular event. Subsequently, the baby monitor may acquire acoustic data (e.g., from the microphone 112) and generate and analyze an acoustic signature, based on the captured data, locally based on its database of acoustic signatures and associated events. The baby monitor may also access a remote database (e.g., at a server over the Internet). Based on the determined event associated with a particular acoustic signature, the baby monitor may access a playlist of sounds and begin playback for soothing of the baby. As above, the playlist may be initialized based on a number of user-defined factors and, in some cases, may be adapted once the baby monitor is deployed based on the particular effectiveness of various songs on the baby's wellbeing.

For example, once the baby monitor detects and classifies a sound as baby crying, if the baby monitor does not have or does not yet have access to the profile of the baby, the baby monitor will play the first song on the playlist for a predetermined time period. If the baby calms, the baby monitor may continue playing the first song for another predetermined time period. However, if the baby continues crying, the baby monitor may advance to the next song in the playlist and repeat this process until the baby stops crying or the playlist is exhausted. The response of the baby may be utilized to reorder portions of the playlist in favor of more effective songs or tracks. If the baby monitor already has a profile for the baby (e.g., the sounds or songs that the baby prefers for different types of crying), the baby monitor plays the first song on the profile playlist for a predetermined time period. As above, if the baby calms, the baby monitor continues playing that song for another predetermined time period. Of course, if the baby continues crying, the baby monitor will advance to the next song in the playlist and repeat the process until the baby stops crying or the playlist is exhausted.

The profile for the baby may be stored in memory 106 or in a remote location such as on a server or in the cloud. The profile includes information such as acoustic signatures of various types of crying and which sound or song is best for calming particular types of crying. The profile and playlist may be adaptive to new data from the baby, user-input data, and/or data pulled from a central database when connected to the Internet. Parents may be provided the option to upload known preferences to give the device better guidance.

Embodiments of the present disclosure may also pertain to a data collection interface to aid in classifying various sounds, in particular crying sounds as they are related to a baby monitoring device. For example, an app may be provided that leverages a cross-platform framework (i.e., works on Android, iOS, and other known development platforms) and that includes an interface for: i) login/registration; ii) a user page after login; iii) an add subject page; and iv) a subject page. The Login/Registration page allows the data collection participants to register for an account and login after an account is created. A client-side authentication may be used for valid credentials. The user page may be unique to each account registered at the server. This user page also contains a function to logout. The user page contains a list of subjects from which data are collected. A button may be used to add more subjects to the list and functionality to remove a subject. Each subject in the list is clickable, leading to a subject page. The add subject page may include a form for adding a subject (e.g., first name, last name, and an optional description). Add and cancel buttons may be provided as needed.

The page may also include: i) a button to start/stop a new recording and display to indicate recording is in session; ii) a timer displaying how much time has elapsed since the recording started; iii) first and last names of the subject; iv) a description of the subject; and v) a list of recordings associated with subject. The acoustic data collected may be processed to remove any identification of speakers and uploaded to the cloud server for training the model.

A computational sound analysis is then performed to develop a model of crying to be used by the baby monitor. In general, the sound analysis includes filtering of raw signals to remove background noise. A sliding window may be applied to the data to compute several features to output classification labels such as ambient sounds, onset of crying, crying, stop of crying.

Both temporal and spectral representations of the signal may be computed. Examples of temporal representations include simple signal statistics (e.g., energy, magnitude, root mean square energy, and zero-crossing rate, and signal duration). Additional representations based on the frequency spectrum include spectral centroid, spectral flatness measures, flux, inharmonicity, and fundamental frequency. Other features include the Mel-Frequency Cepstral Coefficients (MFCCs), the Linear Predictive Coding coefficients (LPC), Line Spectral Frequencies (LSF), Linear-Frequency Cepstrum (LFC), and the Log-Linear Cepstrum (LLFC). MFCCs are derived from a frequency spectrum calculated on the mel scale, an early approximation to human frequency sensitivity. MFCCs are then obtained as the Discrete Cosine Transform of the logarithm of the spectral magnitudes on this frequency axis. Particular feature selection techniques may be applied to select the features that will offer the best performance.

The sound analysis may also employ classification and regression methods to analyze collected sounds. Examples include Support Vector Machines, Support Vector Regressors, Random Forests, Gaussian Mixture Models, Learning Using Privileged information, Multi-task Learning, and Deep Learning Techniques. Classifier ensembles using techniques such as AdaBoost may also be leveraged. After the matching process, score normalization techniques may be used to select the best classification label.

Figure 2:
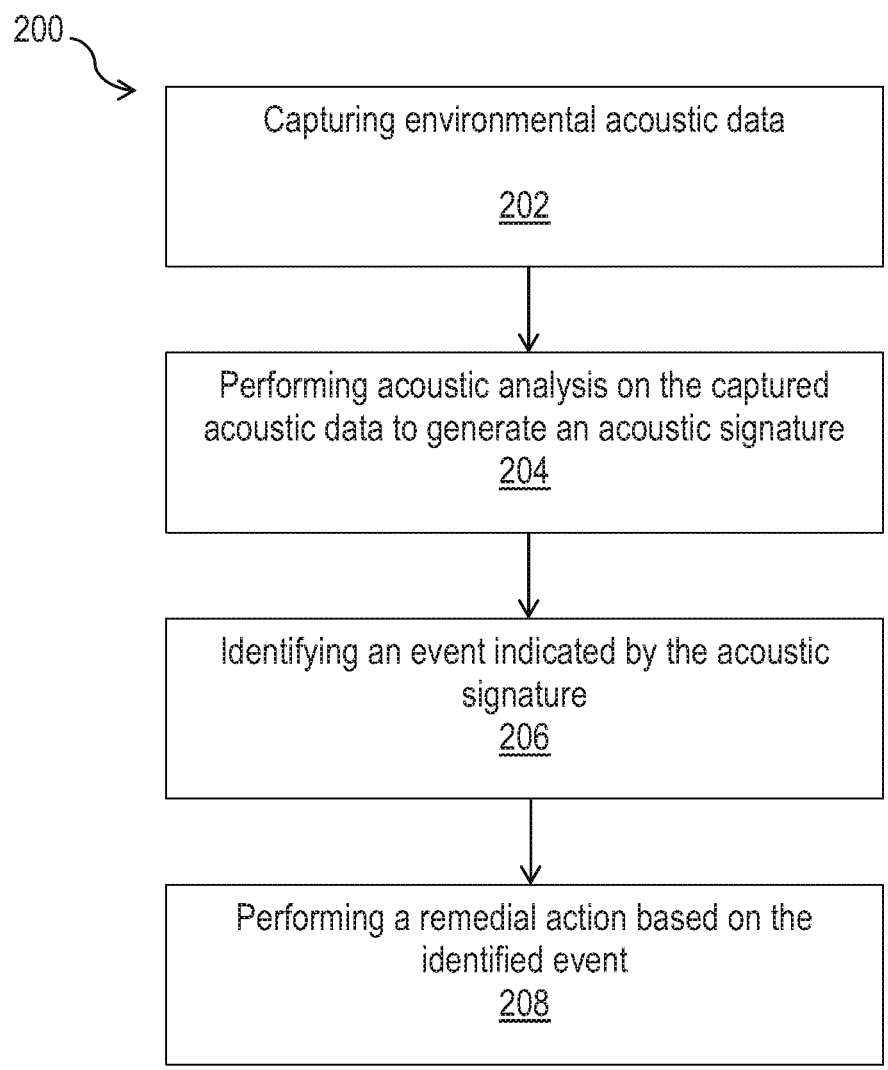
FIG. 2 illustrates a flow chart of a method for intelligent acoustic monitoring according to various embodiments of the present disclosure.

Although described often with respect to baby crying, such acoustic analysis may be leveraged to identify and classify any number of acoustic signatures for future event identification by the processor 104 and subsequent remedial action, if needed. FIG. 2 shows a flow chart of a method 200 in furtherance of the above-described embodiments. The method 200 begins in block 202 with capturing environmental acoustic data and continues in block 204 with performing acoustic analysis on the captured acoustic data to generate an acoustic signature. The method 200 then continues in block 206 with identifying an event indicated by the acoustic signature based on a result of the acoustic analysis and in block 208 with performing a remedial action based on the identified event.

In various embodiments, any of the disclosed technologies may be implemented as part of a microprocessor, an application-specific integrated circuit (ASIC), a system-on-a-chip (SoC), a field-programmable gate array (FPGA), or another type of hardware. Further, it should be appreciated that any or all of the method steps or otherwise-described functionality may be carried out by a processor (e.g., processor 104, possibly in conjunction with other hardware such as microphone 112) as a result of executing instructions stored on a non-transitory computer-readable medium.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the foregoing detailed description, numerous specific details are set forth in order to provide a thorough understanding of the disclosed technologies. However, it will be understood by those skilled in the art that some embodiments may be practiced without these specific details. In other instances, well-known methods, procedures, and components have not been described in detail so as not to obscure the disclosure. Numerous variations and modifications will become apparent to those skilled in the art once the above disclosure is fully appreciated. It is intended that the following claims be interpreted to embrace all such variations and modifications.

What is claimed is:

1. A system for intelligent acoustic monitoring, comprising:
a microphone to capture environmental acoustic data; and
a processor coupled to the microphone and configured to:
receive and perform acoustic analysis on the environmental acoustic data to generate an acoustic signature;
identify, based on a result of the acoustic analysis, an event indicated by the acoustic signature;
perform a remedial action based on the event;
populate a database with acoustic signatures and an associated event for each acoustic signature;
access an audio file over a network of a known event;
perform acoustic analysis on acoustic data of the audio file to generate acoustic signature for the audio file; and
associate the acoustic signature for the audio file with the known event.

2. The system of claim 1 wherein a single computing device comprises the processor and the microphone.

3. The system of claim 1 wherein a computing device comprises the processor and is remote from the microphone, and wherein the computing device is configured to receive the environmental acoustic data over a wired or wireless network.

4. The system of claim 1, wherein the processor is further configured to:
receive the environmental acoustic data from the microphone;
generate a prompt for user input to identify an event associated with the acoustic signature generated based on the environmental acoustic data; and
receive a user input that identifies the event associated with the acoustic signature, thereby associating the event with the acoustic signature.

5. The system of claim 1 wherein the microphone comprises a specialized transducer configured to monitor a vital sign of a living being.

6. The system of claim 1 wherein the event comprises a health or other ailment of a human or an animal, and wherein the remedial action comprises playback of a responsive audio file.

7. The system of claim 6 wherein the processor is further configured to:
   play a first audio file in an audio playlist for a predetermined time period;
   continue to receive the environmental acoustic data and determine whether the event persists;
   based on the event persisting, continue to play the first audio file or begin to play a next audio file in the audio playlist; and
   based on the event subsiding, reduce a volume of an audio playback.

8. The system of claim 6, wherein the processor is further configured to:
   initialize an ordering of audio files in an audio playlist based on user-defined cultural, geographic, socioeconomic, or geopolitical preferences; and
   periodically update the ordering and a content of the audio playlist based on an effectiveness of the audio files of the audio playlist.

9. The system of claim 1 wherein the remedial action comprises generating a communication to a user device, wherein the communication may be one of a text message, an electronic mail message, a voice message, or a telephone call, and wherein the user device may comprise a mobile phone.

10. The system of claim 1 wherein the event comprises an interpersonal interaction and the remedial action comprises providing a psychological analysis of the interpersonal interaction.

11. The system of claim 1 wherein the event comprises a security event and the remedial action comprises generating an alert or an alarm to an authority.

12. The system of claim 1 further comprising a distributed microphone network comprising a plurality of microphones.

13. The system of claim 12 wherein the processor is further configured to:
   receive captured acoustic data from at least some microphones of the distributed microphone network; and
   triangulate an event based on acoustic signatures generated from the captured acoustic data.

14. A non-transitory computer-readable medium comprising instructions that, when executed by a processor, cause the processor to:
   receive captured environmental acoustic data;
   perform acoustic analysis on the captured environmental acoustic data to generate an acoustic signature;
   identify, based on a result of the acoustic analysis, an event indicated by the acoustic signature, wherein the event comprises a health or other ailment of a human or an animal;
   perform a remedial action based on the event, wherein the remedial action comprises playback of a responsive audio file;
   initialize an ordering of audio files in an audio playlist based on user-defined cultural, geographic, socioeconomic, or geopolitical preferences; and
   periodically update the ordering and a content of the audio playlist based on an effectiveness of the audio files.

15. A calming system, comprising:
   a microphone to capture environmental acoustic data; and
   a processor coupled to the microphone and configured to:
      receive and perform acoustic analysis on the environmental acoustic data to generate an acoustic signature;
      based on a result of the acoustic analysis, determine that the environmental acoustic data is indicative of sound produced by a subject under stress;
      responsive to a determination that the environmental acoustic data is indicative of sound produced by a subject under stress, generate a first audio signal selected to soothe the subject under stress;
      receive additional acoustic data from the microphone during and/or after generation of the first audio signal, and perform acoustic analysis of the additional acoustic data to determine whether the first audio signal is effective to soothe the subject under stress; and
      responsive to a determination that the first audio signal is ineffective to soothe the subject under stress, generate a second audio signal selected to soothe the subject under stress, wherein the second audio signal is different from the first audio signal.

16. The calming system of claim 15, wherein the processor is further configured to:
   receive further acoustic data from the microphone during generation of the second audio signal, and perform acoustic analysis of the further acoustic data to determine which of the first audio signal and the second audio signal is more effective to soothe the subject under stress;
   record a measure of relative effectiveness of the first audio signal and the second audio signal in a storage device coupled to the processor; and
   generate the first audio signal and the second audio signal in order corresponding to the measure of relative effectiveness responsive to a determination that the subject is under stress, such that a more effective one of the first audio signal and the second audio signal is generated prior to a less effective one of the first audio signal and the second audio signal.

17. The calming system of claim 16, wherein the processor is further configured to:
   record a time of day value in association with the measure of relative effectiveness; and
   select one of the first audio signal and the second audio signal to generate based on which of the first audio signal and the second audio signal is recorded as more effective at the time of day corresponding to a current time of day.

18. The calming system of claim 15, wherein the processor is configured to select the first audio signal from a plurality of audio signals based on demographic information associated with the subject, and wherein each of the plurality of audio signals is associated with a measure of relative effectiveness for soothing a subject associated with the demographic information.

* * * * *